(12) United States Patent
Solis Herrera

(10) Patent No.: US 8,691,891 B2
(45) Date of Patent: Apr. 8, 2014

(54) CEMENT MIXTURE WITH SIGNIFICANTLY IMPROVED PHYSICOCHEMICAL AND BACTERIOLOGICAL PROPERTIES THAT CONTAINS DOPAMELANIN, PRECURSORS THEREOF, ANALOGUES THEREOF OR DERIVATIVES THEREOF, AS AN ADDITIVE

(76) Inventor: Arturo Solis Herrera, Auguascalientes (MX)

( * ) Notice: Subject to any disclaimer, the term of this patent is extended or adjusted under 35 U.S.C. 154(b) by 344 days.

(21) Appl. No.: 13/126,753

(22) PCT Filed: Nov. 28, 2008

(86) PCT No.: PCT/MX2008/000165
§ 371 (c)(1),
(2), (4) Date: Apr. 28, 2011

(87) PCT Pub. No.: WO2010/062155
PCT Pub. Date: Jun. 3, 2010

(65) Prior Publication Data
US 2011/0207853 A1    Aug. 25, 2011

(51) Int. Cl.
*C04B 26/10*    (2006.01)
(52) U.S. Cl.
USPC .................................................. 524/2
(58) Field of Classification Search
USPC .................................................. 524/2
See application file for complete search history.

(56) References Cited

FOREIGN PATENT DOCUMENTS

| JP | 11278893 | A |   | 10/1999 |   |   |
|----|----------|---|---|---------|---|---|
| JP | 2001026474 | A |   | 1/2001 |   |   |
| JP | 2006027995 | A |   | 2/2006 |   |   |
| KR | 20010027978 | A | * | 4/2001 | .............. | C04B 16/04 |
| KR | 20030059512 | A |   | 7/2003 |   |   |
| KR | 20080032925 | A | * | 4/2008 | .............. | C04B 14/06 |

OTHER PUBLICATIONS

International Search Report in Spanish, mailing date Jul. 27, 2009, for corresponding International Application No. PCT/MX2008/000165 and an English translation.
Written Opinion in Spanish, mailing date Jul. 27, 2009, for corresponding International Application No. PCT/MX2008/000165.

* cited by examiner

*Primary Examiner* — Robert D. Harlan
(74) *Attorney, Agent, or Firm* — Intellectual Property Law Group LLP

(57) ABSTRACT

The present invention refers to a cement composition that contains dopamelanin, its precursors and/or its analogues as an additive in a maximum percentage of 30% of the cement. This additive substitutes water of the capillary nets. The mentioned cement mixture posses a water/cement relation of 0.2 to 0.4, optionally it can contain different sand and gravel proportions. This cement mixture generates strong chemical bonds, and increased scouring resistance, of at least 28% and a higher elastic resistance of the concrete, of at least 50%. Its cracking in early stages is very low or practically null. The present request also refers to the use of dopamelanin and/or its precursors and/or its analogues as an additive of the cement mixture that substitutes the capillary water proportion in the cementant mixture. Just as well the use of dopamelanin and/or its precursors and/or its analogues, in an aqueous solution, in less that 3%, as a concrete setting and curing agent, thus it significantly increases the ductility and scouring resistance of the cement mixture. This is, the novelty cement mixture improves the physicochemical and bacteriological properties of the usual concrete, being of special interest the notable increment related with compression resistance and ductility or relative displacements, suffering less damage in comparison with the mixture containing water. In a meaningful way, it also increases since early stages, the volumetric stability of the concrete, thus it intensifies its scouring resistance, which is inclusive transmitter to the metallic elements immersed in its interior, since certainly it significantly protects them from deterioration.

3 Claims, No Drawings

CEMENT MIXTURE WITH SIGNIFICANTLY IMPROVED PHYSICOCHEMICAL AND BACTERIOLOGICAL PROPERTIES THAT CONTAINS DOPAMELANIN, PRECURSORS THEREOF, ANALOGUES THEREOF OR DERIVATIVES THEREOF, AS AN ADDITIVE

FIELD OF INVENTION

The present invention refers to the elaboration of a cement mixture with significantly better physical (mechanical), bacteriological and physicochemical properties than conventional mixtures; due that this mortar contains dopamelanin and/or its precursors, and/or analogues, and/or derivatives, as an additive.

BACKGROUND

The conventional concrete is produced by mixing three essential components: cement, water and aggregates, to which eventually a fourth component is added. This component is generically named as an additive, although the air is another component. Chemically, concrete is composed by the four most abundant substances on the crust of the earth (silicates, aluminates, iron and calcium components).

We can make clear that cement, one of the concrete components, was used since the beginning of the 800's and since then, the Portland cement has become the most worldwide used cement.

Cement mixture can be hydraulic when setting and hardening, as they chemically react with water; or they can be aerial, when they set and harden in contact with air.

In both cement mixtures, the initial desirable characteristics of the mixture or fresh concrete are: plasticity, moulding and easy compactibility. But this mortar will gradually turn rigid acquiring the aspect, behaviour and properties of a solid body forming the hardened concrete.

Consequently with this, the mechanical behavior and durability of this material in the service it offers, depends on three basic aspects:
1. The characteristics, composition and properties of the hardened cementing matrix: this implies the selection of an appropriate cement mixture, the use of a convenient relation water/cement of 0.2 to 0.4 and the eventually use of a necessary additive, with all of which it may result in a potentially safe quality.
2. The quality aggregates, according to the functions that the structure will perform, so that they do not represent the weak point in the behaviour of concrete and its capacity to resist adequately and for a long time to exposure and service conditions, to which it is submitted.
3. The cement matrix affinity with the aggregates and its capacity to work together, depends on the physical and chemical characteristics of the cement, the mineralogic and petrographic composition of the rocks that conform the aggregate and the form, maximum size of the particle and superficial texture of them.

Besides the physical characteristics, that contribute to the intrinsic quality of the concrete and that can be quantified, they are included: its mechanic resistance, elasticity, thermal properties and maximum particle size; which allow establishing the cement mixture quality according to the corresponding national and international standards (ASTM International). This is, the material utilized for the elaboration of the concrete affects the facility with which it can be poured and finished, it also affects the time it needs to harden, the resistance it can acquire and how well it covers the functions for which it was prepared.

The way in which each one of the components of the cement mixture contributes in its properties and particular characteristics are mentioned straight away. The different kinds and classes of cement affect the cohesion, workability, settling down and pouring at the time of hardening, mechanic resistance acquisition, heat generation, resistance against attack of sulfate, dimensional stability (volumetric changes) and the chemical stability (cement-aggregates reactions). In some aspects, the influence of the cement is fundamental, but in others it has a fewer importance because there are other factors that also influence and of which effects are more outstanding.

Water has two different applications as a concrete component: an internal one when it is used in the mixture and other external when concrete is "cured" with it. Although in this applications the water characteristics have different effects on the concrete, it is desirable to employ water of the same quality in both cases. The quality requirements for the water used in the concrete mixture has no obliged relation with the bacteriological aspect (as in case of drinkable water), basically it refers to its physicochemical characteristics and its effects over the properties of the concrete and behaviour. Upon the undesirable effects that can show up because of the use of inadequate water, they can appear in a short period of time (related with the hardening time and the initial resistances), in a medium period of time (with resistances after 28 or more days) and in a long term (can consist in attack for sulfate, the alkali-aggregate reaction and the scouring of the reinforcement steel). The quantity of water necessary for hardening, has a maximum proportion of 40% respect to the cement quantity. The supplementary or extra water can be in a proportion of almost a 30% more; it is not fixed and occupies certain volume in form of capillary pores in the hardened cementant mixture. The bigger the water excess presence there will be more capillaries quantity in the cement paste. When the total quantity of capillaries correspond to a water/cement relation (w/c)=0.7, the capillaries are so numerous that they are united between them forming a permeable net. In consequence, if you add 70 g water to 100 g cement (w/c=0.7), the first 20 g are chemically fixed, the following 20 g are fixed by adsortion and the remaining 30 g stay free in the capillary net.

In the conventional hydraulic concrete mixtures, the aggregates use to represent approximately between 60% and 75% of the absolute volume of all the components; that is why the remarkable influence that the aggregates characteristics and properties exert over the corresponding concrete. There are diverse materials that with certain frequency accompany the aggregate, and whose presence is inconvenient, for example: the undesirable fine materials (lime and clay), and organic matter (humus and small fragments of roots, plants or wood), among others.

The additive, is a different material to the water, the hydraulic cement aggregates and the reinforcement fibers, and it is added to the mortar immediately before or during the mixing (American Concrete Institute or ACI 116(26)). This is, the concrete additives are used for the fundamental purpose to modify, in a convenient way, the behaviour of the concrete in its fresh state, and/or induce or improve determined desirable properties in the hardened concrete. This will represent a lower cost because of energy saving, for example increasing the defense characteristics against freezing and thawing, the delay or acceleration of the hardening time and a very high resistance is obtained, to mention some.

Some of the cement mixture components can be organic, containing N and/or fat acids in their structures, can be thermoplastic that in general increase the tension force and its flexibility. As shown by the patents or patent requests: MX/A/2004/010631, WO2006/116387 A2, MX230744, MX221807, MX167038, PA/A/2006/005553, JP2004231497, JP2001213649, KR20010027978, ES2,030,845, JP11107459, RU2275342. Some cement mixtures hold elements to prevent scouring (MX154260, MX187569, PA/a/2006/005091, JP2004231497). Also, many other cement mixtures have been described (GB 2,398,296, JP2004224647, USRE37,655, MX/PA/A/2002/012612, U.S. Pat. No. 6,755,907, DE4324190, JP2003107025, JP4292447, JP9296033, MX 191331, PA/a/1999/008311, MX160941, PA/a/1999/02182, PA/a/1996/05755, MX241331, PA/a/1998/09713, MX253295, MX/A/2008/003801, WO1995/13995, WO01/14277).

Additives can be nanoparticles (US2008/0242769A1), can be antimicrobials (US 2008/0242769 A1), they can be granular, polymeric and/or water-soluble; all of which are added with the purpose of preventing contaminations, increasing flexibility, acoustic insulation and adhesivity, among others (MX 238915, JP8059325, ES2135634, CH679665, DE3436215, DE3143071, U.S. Pat. No. 3,042,608, U.S. Pat. No. 6,902,002). Other additives are made out of worn out materials (KR20030088716, ES2152197, DE19728164).

Particularly, in this patent request, dopamelanin and/or its precursors and/or its analogues and/or derivatives, is/are used as an additive, considering and taking advantage due to peculiar characteristics of this component.

Lets remember the extraordinary melanin and melanocite properties related to water (melanin, in presence of light, dissociates water); these properties have been glimpsed relatively short time ago; thus the publications that called the attention related to the theme initiated around 1996. Since 1997 it has been proposed (Solis Herrera, 1997), to utilize the unusual capacities of melanin molecule for diverse industrial processes, such as reusable energy generation, for medicinal purposes, and this document proposes the melanin utilization to improve the concrete qualities in the curing processes, improving its physical resistance qualities, flexibility without diminishing drastically its mechanic capacities (ductility) and scouring resistance, that cause loss in steel-concrete adherence and nominal diameter in the reinforcement steel, which in many cases is the cause of collapses, in more or less grade and in direct or indirect form.

Melanin posses chemical, biochemical and electronic properties that have not been clarified, detected, understood, or predicted in its whole; but one of them is that melanin generates molecular oxygen and hydrogen derived from the water photolysis. This is based on the following reaction:

$$2H_2O \leftrightarrow 2H_2 + O_2 + 4e^-$$

For this cause, to more the melanin, the concrete will dispose of a major quantity of molecular oxygen and hydrogen, as well as energy and high energy electrons to carry out diverse chemical reaction that regularly occurred in all the components, from which concrete is not the exception.

OBJECTIVE OF THE INVENTION

Considering that concrete is the second substance (after water) mostly used by the man, the objective of the present invention is to present a new concrete mixture with significantly increased resistance, flexibility (ductility), compactness and scouring resistance properties.

DETAILED DESCRIPTION OF THE INVENTION

Based on the fabrication experience of concrete mixtures with dopamelanin and/or its precursors and/or its analogues and/or its derivatives, the cement mixture qualities related with the characteristics and properties of the additive utilized in this invention, have been analyzed.

The internal structure of the new cement mixture has an increased density (due to a higher molecular attraction) and a higher homogeneity, which raises its flexibility and avoids fault areas during the hardening process. These characteristics are related with the capacity of additive to diminish the air bubbles immersed in the mixture and the molecular repulsions. Moreover, its combination capacity (as bonding) facilitates molecular approximation. In other side, the consistence of cement mixture is softer and significantly more plastic, easy to handle and therefore much more easy to work with.

Other characteristics, that depend on the internal structure of cement mixture, are a higher resistance, flexibility (ductility) and scouring resistance, due to molecule size of the melanin (estimated in millions of Daltons) and presence of charges; for this cause the additive can be diluted in water at different concentrations, but inclusive in concentrations under 3% of the volumetric weight (weight/volume). These characteristics, present in the new mixture, are important in the construction field. For example, in the seismic response demand for the different service states to which structures are submitted, allowing the utilization of more slender (plastic) structural elements, with fewer reinforcement steel quantities (example, steel bars), which leads to a costs decrease and the possibility to construct bigger clear spaces with less structural elements (as columns).

The new cement mixture holds scouring resistance properties due to the antirust quality of the additive. Therefore, the presence of the additive inhibits microorganisms growth, because of the presence of molecular oxygen resulting from the activity of dopamelanin over the water molecules (anaerobic microorganisms are specially inhibited), so that the mixture can be used in humid zones. Also, the attack of diverse xenobiotic substances that deposit into the structure (and come from known or unknown sources, from dangerous or harmful substances), are adsorbed or absorbed and later gradually liberated in a modified way, in a high or low grade, depending on each substance, its structure/activity relation or the presence of sulphidryls, among others.

The major stability of the cement mixture presented by this invention is also due to the intrinsic property of the dopamelanin buffer; avoiding the temperature or the acid/alkaline media actions, which prevents the deterioration of the mixture and eventually avoids the collapse structure in its whole. In the other hand, the mixture that possess activity of dopamelanin, results in a more complete one because it is capable to produce a major availability of high energy electrons and molecular oxygen and hydrogen, combined with its capacity to absorb a big and diverse compounds quantity and diversity. This creates a structure with a major efficiency, generated by the new mixture, capable to promptly respond to the different environmental, extraordinary, circumstantial or everyday solicitations (affronts, abrupt changes, attacks), resulting from the forces or the changes in themselves (moments), that conduce to deterioration of the structure related with aging. This means that the structure formed from a mixture that has a higher dopamelanin quantity will present a higher tolerance capacity to biochemical and physical affront, comparing against a concrete with a fewer additive quantity.

Other characteristics, different from the conventional concrete, have been observed in the new one. For example, related to appearance mixture, it has a darker color, with a pleasant to the view aspect. It is notorious that concretes made with the additive have no odor, in contrast with conventional ones, that can be explained because the dopamelanin forms covalent links with the thiols, that are one of the molecules that most commonly relate with aromatic compounds. On the other hand, considering the usual concrete heat-emitting reaction, perceptible when they are applied, in the concrete added with melanin the temperature changes are less pronounced, this means that the reactions are more stable because they loose less energy in form of heat. Since dopamelanin allows that a larger energy quantity can be used in the formation of different types of chemical links; this is why it is a "cooler" concrete when it is touched. Its higher workability allows finer and more precise finishes; with a major adaptability to the centering or mold used for its pouring, since it is easier to copy their form with less added process, like vibration. The phenomenon known as "draining", (paste and rocky aggregates segregation), decreases drastically when the additive is used, du to that the vibration processes are present in a less quantity and frequency than in a conventional concrete. The mixture exhibits a higher adhesivity, which in case of the finish, allows to apply a more uniform, esthetic and pleasant to the view and touch layer, with much less effort or work.

One of the applications that this cement mixture possess, is linked with buildings related with gamma ray emission (for example nuclear central stations), the mixture is capable to absorb radiations due to the dopamelanin presence. For this reason, apart from having walls 50% less thick in comparison with walls constructed with the conventional mixture, isolation from these lethal radiations is much more effective.

The structure/activity relation of the concrete/additive interface allows to utilize it as a self-leveling concrete, which in extensions cases such as pavements, it represents an important saving in the workmanship required for a better finish, which in the case of melanin would be significantly less.

Related to sun exposure, the structures constructed with the new cement mixture, when hardening they will have a more uniform temperature, despite the differences in the solar radiations they received related to areas exposed to a higher or lower sunlight quantity. The chemical reaction has fewer temperature differences within the concrete mixture, generating a much more adequate structure for the purpose to which it is calculated. The chemical stability conferred to concrete by dopamelanin, also offers advantages related to the hardening process because the hardening temperature is more stable, in fact the advantages are present since the additive is added, and also when it is aggregated during the hardening (external humectation), with the purpose of reducing more gradually the humidity range; which results in a hardened concrete with better properties.

Summarizing, dopamelanin, its precursors, analogues or derivatives are used in cement mixtures as an additive that gives remarkable characteristics such as:

a) Antirust:
   When applied to concrete prevents oxidizing latent zones in the reinforcement steel, which avoid subsequent faults of the elements because of rusting or inclemency actions.
   With this the steel preserves its geometric properties without being affected by rusting caused by the oxygen-steel with its different alloys reaction.
   It can be used in places where exposure to alkali and environmental relative humidity, is considered high.

b) Its increases mechanical properties:
   When incorporated to the cement-sand and cement-gravel-sand mixtures, it generates a tempered exothermic reaction, with this the concrete contraction diminishes remarkably and the cracking in early stages is very small or practically null.
   Generates high attraction chemical bonds and with this, increases its compression capacity, so its vacuum relation is low, with this a more dense element is obtained. This means: its density and volumetric stability is significantly higher, which makes it more predictable.
   At the same time it intensifies its mechanical properties in the presence of lateral demands, increasing its elastic range and as consequence there is less damage in the elements (ductility).
   Diminishes the transversal sections of the elements and the amounts of steel required for certain displacement demands.
   Aggregating a major additive quantity to the mixture in latent zones of the plastic hinges, increases its rotation and joint generation capacity for the energy dissipation during an earthquake.

c) Improves finish of the elements.
   Dopamelanin additive, its precursors, analogues or derivatives, in an aqueous solution, when incorporated to the cement-sand and cement-gravel-sand mixture, it significantly diminishes vacuums formation, usually generated by the mixture with water. The resulting texture is sight pleasant.
   Requires less vibration at the time of cast of the elements diminishing a possible segregation in the mixture and as a consequence, a drainage in the concrete.

One of the advantages offered by the additive in the cement mixture is that it allows the construction of:
   a) Masonry junctions.
   b) Profound foundations.
   c) Elements exposed to high relative humidity or that are submerged in aqueous media.
   d) Shear walls in masonry buildings.
   e) Concrete elements in buildings located in high displacement demand areas (seismic zones).
   f) Elements that require capricious forms and fine finishing.

When it is fresh, the new cement mixture reaches a major density, is more homogeneous, stable, flexible, it has a higher castability, and a better workability. These characteristics appear much more quickly than in the conventional mixture. This means, its hardening is accelerated in a notorious way, thanks to higher energy availability, carried by the hydrogen that results from the water dissociation caused by dopamelanin. This allows that the chemical reactions that conform the whole (of the concrete), take place in a more efficient way, given the higher hydrogen availability and therefore its valuable energy charges. Remember that hydrogen is the energy carrier mostly used by Nature in the universe. These characteristics produce a more firm hardened cement mixture, with a higher scouring resistance, a bigger microorganism growing inhibition, a more stable temperature, capability to absorb more long electromagnetic radiation wavelengths, (including gamma rays), it has a darker color, is odorless and pleasant to the touch and sight. The mentioned above is related with a different water molecule in presence of dopamelanin, since for example, evaporation is drastically reduced.

The present invention claims a cement composition that comprises dopamelanin, and/or its precursors and/or its analogues as an additive, in a maximum percentage of the 30% of the concrete, this additive substitutes water of the capillary nets said cement mixture possess a water/cement relation of 0.2 to 0.4, but not limited to this proportion, and optionally it can contain gravel and sand in different proportions, said cement mixture generates strong chemical bonds (due to the higher energy availability carried by hydrogen), and an increased scouring resistance, at least 28% and a higher elastic resistance of at least 50%, with a low or practically null cracking within the early stages.

The present request also claims the use of dopamelanin and/or its precursors and/or its analogues, as additive of the cement mixture that substitutes the capillary water proportion in the cement mixture. Or either the use of dopamelanin and/or its precursors and/or its analogues, in an aqueous solution, in a percentage of minus 3% (but not limited to), as an agent for setting (hardening) and curing the cement, which significantly improves the ductility, resistance and scouring resistance of the cement mixture. Summarizing dopamelanin significantly improves the physicochemical and bacteriological properties of the concrete.

EXAMPLES

A cement mixture was made using dopamelanin as an additive, this additive is chemically synthesized with a black opaque color and a totally liquid consistency.

It was synthesized within the major quality and similarity standards to the organic compound. The additive was applied substituting the portion of the water in the

| SPECIMEN TYPE | AGE (days) | BASE (cm) | RISE (cm) | LENGTH (cm2) | MAXIMUM APPLIED CHARGE | RESISTANCE (kg/cm2) |
|---|---|---|---|---|---|---|
| Cement with dopamelanin | 30 days | 19.86 | 3.83 | 76.156 | 23.048 | 322.46 |
| Cement without dopamelanin | 30 days | 19.80 | 3.675 | 72.765 | 18.315 | 251.25 | mixture, without disturbing water/cement relation, that was previously calculated for the resistance required by the mixture Compression tests were realized to mortar tiles and bending essay tests to cement mixtures with dopamelanin and specimens without dopamelanin. The compression tests applied to cement tiles were realized in an average of three specimen proof for the cement with dopamelanin and in an average of two specimen proof for the cement without dopamelanin.

The results show that the cement with the cement without dopamelanin presents a maximum resistance of maximum resistance of 326.14 kg/cm2, on the other hand the cement without dopamelanin presents a maximum resistance of 274.69 kg/cm2; the cement with dopamelanin supports at least 25% more of maximum applied load respect to the cement without dopamelanin and the resistance increases at least 28% respect to the cement without dopamelanin.

Bending essay tests were made to cement with dopamelanin and cement without dopamelanin samples, the following chart shows an average of the four tested samples for cement with dopamelanin and three tested samples for cement without dopamelanin.

| SPECIMEN TYPE | AGE (days) | LENGHT (cm) | | AREA (cm2) | MAXIMUM APPLIED CHARGE | |
|---|---|---|---|---|---|---|
| Cement with dopamelanin | 30 days | 3.90 | 19.87 | 20.00 | 163.69 | 0.495 |
| Cement without dopamelanin | 30 days | 3.86 | 19.80 | 19.73 | 150.92 | 0.486 |

The cement with dopamelanin supports a maximum applied load of 163.69 kgf, to say, it supported at least 30% more of the maximum applied load respect to the cement without dopamelanin. Besides, the cracking in early stages is very low or practically null, comparing it with the conventional cement.

Since the process for mixtures implementation, it is easy to perceive the difference between both, since the mixture with dopamelanin tends to stabilize faster, in comparison with the mixture with water, because this last one requires a 20% more cement to reach the stability of dopamelanin mixture. This increase is the setting velocity, is a characteristic that has relevant practical applications, for example when applying in high relative humidity zones.

What is claimed is:

1. A cement composition comprising: dopamelanin and/or precursors of dopamelanin and/or analogues of dopamelanin and/or derivatives of dopamelanin, as an additive in a maximum percentage of 30% of the cement, the additive substitutes the water of capillary nets; said cement composition possesses a water-cement relation of 0.2 to 0.4, and optionally includes different gravel and sand proportions; said cement composition generates strong chemical bonds, a higher scouring resistance of at least 28% and a higher elastic resistance of concrete of at least 50%, thereby having a significantly lower cracking in early stages in comparison with conventional concrete.

2. An additive in a cement mixture comprising: dopamelanin and/or precursors of dopamelanin and/or analogues of dopamelanin and/or derivatives of dopamelanin, the additive substitutes a capillary water proportion in the cement mixture.

3. An agent for setting and curing concrete comprising: dopamelanin and/or precursors of dopamelanin and/or analogues of dopamelanin and/or derivatives of dopamelanin in an aqueous solution, in a concentration of below 3%, and which increases physicochemical and bacteriological properties of the concrete.

* * * * *